US012296451B2

(12) United States Patent
Leathrum et al.

(10) Patent No.: US 12,296,451 B2
(45) Date of Patent: May 13, 2025

(54) MAGAZINE FOR POWERED FASTENER DRIVER

(71) Applicant: MILWAUKEE ELECTRIC TOOL CORPORATION, Brookfield, WI (US)

(72) Inventors: Travis W. Leathrum, Milwaukee, WI (US); Troy C. Thorson, Cedarburg, WI (US); Casey D. Garces, Milwaukee, WI (US); Andrew P. Rux, Greendale, WI (US); Andrew R. Wyler, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 121 days.

(21) Appl. No.: 18/182,785

(22) Filed: Mar. 13, 2023

(65) Prior Publication Data

US 2023/0294259 A1 Sep. 21, 2023

Related U.S. Application Data

(60) Provisional application No. 63/319,837, filed on Mar. 15, 2022.

(51) Int. Cl.

| | |
|---|---|
| ***B25C 1/00*** | (2006.01) |
| ***B25C 1/04*** | (2006.01) |
| ***B25C 1/06*** | (2006.01) |

(52) U.S. Cl.
CPC .............. *B25C 1/003* (2013.01); *B25C 1/047* (2013.01); *B25C 1/06* (2013.01)

(58) Field of Classification Search
CPC ............ B25C 1/003; B25C 1/047; B25C 1/06
See application file for complete search history.

(56) References Cited

U.S. PATENT DOCUMENTS

| | | | | |
|---|---|---|---|---|
| 2,575,455 A | | 11/1951 | Lang | |
| 2,580,444 A | | 1/1952 | Lang | |
| 2,701,360 A | | 2/1955 | Lang | |
| 3,330,462 A | | 7/1967 | Colechia et al. | |
| 3,524,576 A | * | 8/1970 | Bader | B25C 1/003 227/136 |
| 3,628,715 A | | 12/1971 | Maynard et al. | |
| 3,688,966 A | * | 9/1972 | Perkins | B25C 1/041 227/127 |
| 3,854,648 A | | 12/1974 | Inzoli et al. | |
| 4,149,297 A | | 4/1979 | Monacelli | |
| 5,135,152 A | | 8/1992 | Uno et al. | |

(Continued)

FOREIGN PATENT DOCUMENTS

DE 2248956 A1 4/1973

OTHER PUBLICATIONS

Partial European Search Report for Application No. 23161831.5 dated Oct. 5, 2023 (12 pages).

*Primary Examiner* — Michelle Lopez
(74) *Attorney, Agent, or Firm* — Michael Best & Friedrich LLP

(57) ABSTRACT

A powered fastener driver comprising, a housing including a head portion, a handle portion extending therefrom, the handle portion including a first end coupled with the head portion and an opposite, second end, and a drive unit portion, and a canister magazine configured to receive coiled fasteners. At least a portion of the canister magazine is integrally formed as a single piece with at least a portion of the drive unit portion of the housing.

19 Claims, 17 Drawing Sheets

(56) References Cited

U.S. PATENT DOCUMENTS

| | | | | |
|---|---|---|---|---|
| 6,152,346 | A | 11/2000 | Laubach | |
| 6,779,700 | B2 | 8/2004 | Bruins et al. | |
| 6,968,945 | B2 | 11/2005 | Bruins et al. | |
| 7,232,051 | B2 * | 6/2007 | Huang | B25C 1/003 227/119 |
| 7,896,212 | B2 | 3/2011 | Uejima et al. | |
| 8,276,798 | B2 * | 10/2012 | Moeller | B25C 5/1627 227/138 |
| 8,302,832 | B2 | 11/2012 | Porth et al. | |
| 8,657,173 | B2 | 2/2014 | Uejima et al. | |
| 8,931,677 | B2 | 1/2015 | Porth et al. | |
| 10,279,460 | B2 * | 5/2019 | Li | B25C 1/003 |
| 11,446,802 | B2 | 9/2022 | Rux | |
| 2003/0015565 | A1 | 1/2003 | Lee | |
| 2006/0213946 | A1 | 9/2006 | Shkolnikov | |
| 2007/0221698 | A1 | 9/2007 | St. John et al. | |
| 2013/0037593 | A1 * | 2/2013 | Porth | B25C 5/1627 227/10 |
| 2020/0246950 | A1 * | 8/2020 | Desch | B25C 1/041 |
| 2020/0276690 | A1 | 9/2020 | Hegarty et al. | |
| 2021/0347022 | A1 * | 11/2021 | Leathrum | B25C 1/003 |

* cited by examiner

MAGAZINE FOR POWERED FASTENER DRIVER

CROSS-REFERENCE TO RELATED APPLICATIONS

This application claims priority to U.S. Provisional Patent Application No. 63/319,837 filed on Mar. 15, 2022, the entire contents of which are incorporated herein by reference.

FIELD OF THE INVENTION

The present invention relates to powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation.

SUMMARY OF THE INVENTION

The present invention provides, in one aspect, a powered fastener driver comprising, a housing including a head portion, a handle portion extending therefrom, the handle portion including a first end coupled with the head portion and an opposite, second end, and a drive unit portion, a nosepiece extending from the housing, a driver blade movable within the nosepiece along a driving axis between a top-dead-center (TDC) position and a driven or bottom-dead-center (BDC) position, a drive unit for moving the driver blade along the driving axis from the BDC position toward the TDC position, the drive unit positioned within the drive unit portion of the housing, a piston coupled to the driver blade for movement therewith, a driver cylinder within which the piston is movable, the driver cylinder being located within the head portion of the housing, and a canister magazine configured to receive coiled fasteners. At least a portion of the canister magazine is integrally formed as a single piece with at least a portion of the drive unit portion of the housing.

The present invention provides, in another aspect, a powered fastener driver including a housing including a head portion and a handle portion extending therefrom, the handle portion including a first end coupled with the head portion and an opposite, second end, a nosepiece extending from the housing, a driver blade movable within the nosepiece along a driving axis between a top-dead-center (TDC) position and a driven or bottom-dead-center (BDC) position, a drive unit for moving the driver blade along the driving axis from the BDC position toward the TDC position, the drive unit positioned within the drive unit portion of the housing, a piston coupled to the driver blade for movement therewith, a driver cylinder within which the piston is movable, the driver cylinder being located within the head portion of the housing, a battery pack coupled to the handle portion, and a canister magazine configured to receive coiled fasteners. The housing includes a mold seam positioned behind the drive unit and below the battery pack, and wherein the housing is co-molded to the canister magazine along the mold seam.

The present invention provides, in another aspect, a powered fastener driver comprising, a housing including a head portion and a handle portion extending therefrom, the handle portion including a first end coupled with the head portion and an opposite, second end, a nosepiece extending from the housing, a driver blade movable within the nosepiece along a driving axis between a top-dead-center (TDC) position and a driven or bottom-dead-center (BDC) position, a piston coupled to the driver blade for movement therewith, a driver cylinder within which the piston is movable, the driver cylinder being located within the head portion of the housing, and a canister magazine configured to receive coiled fasteners, the canister magazine being positioned on an opposite side of an imaginary plane as the second end of the handle portion. The imaginary plane is parallel to the driving axis.

The present invention provides, in yet another aspect, a powered fastener driver comprising, a housing including a handle portion for a user to hold the powered fastener driver, a nosepiece extending from the housing, a driver blade movable within the nosepiece along a driving axis between a top-dead-center (TDC) position and a driven or bottom-dead-center (BDC) position, a piston coupled to the driver blade for movement therewith, a driver cylinder within which the piston is movable, and a magazine. The magazine includes a canister portion configured to receive coiled fasteners, a linear portion adjacent the nosepiece, and a transition portion interconnecting the canister portion and the linear portion. The fasteners are rotated 90 degrees during movement through the transition portion of the magazine.

The present invention provides, in yet another aspect, a powered fastener driver comprising, a housing including a head portion, a handle portion extending therefrom, the handle portion including a first end coupled with the head portion and an opposite, second end, and a drive unit portion, a nosepiece extending from the housing, a driver blade movable within the nosepiece along a driving axis between a top-dead-center (TDC) position and a driven or bottom-dead-center (BDC) position, a drive unit for moving the driver blade along the driving axis from the BDC position toward the TDC position, the drive unit positioned within the drive unit portion of the housing, a piston coupled to the driver blade for movement therewith, and a driver cylinder within which the piston is movable, the driver cylinder being located within the head portion of the housing. The drive unit portion of the housing defines a drive unit axis and the handle portion defines a handle axis, and wherein the drive unit axis is oriented at an oblique angle relative to the handle axis in an imaginary plane oriented perpendicular to the driving axis.

The present invention provides, in yet another aspect, a powered fastener driver comprising, a housing including a head portion, a handle portion extending therefrom, the handle portion including a first end coupled with the head portion and an opposite, second end, and a drive unit portion, a nosepiece extending from the housing, a driver blade movable within the nosepiece along a driving axis between a top-dead-center (TDC) position and a driven or bottom-dead-center (BDC) position, a drive unit for moving the driver blade along the driving axis from the BDC position toward the TDC position, the drive unit positioned within the drive unit portion of the housing, a piston coupled to the driver blade for movement therewith, and a driver cylinder within which the piston is movable, the driver cylinder being located within the head portion of the housing. The drive unit portion of the housing defines a drive unit axis that is oriented parallel to the driving axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
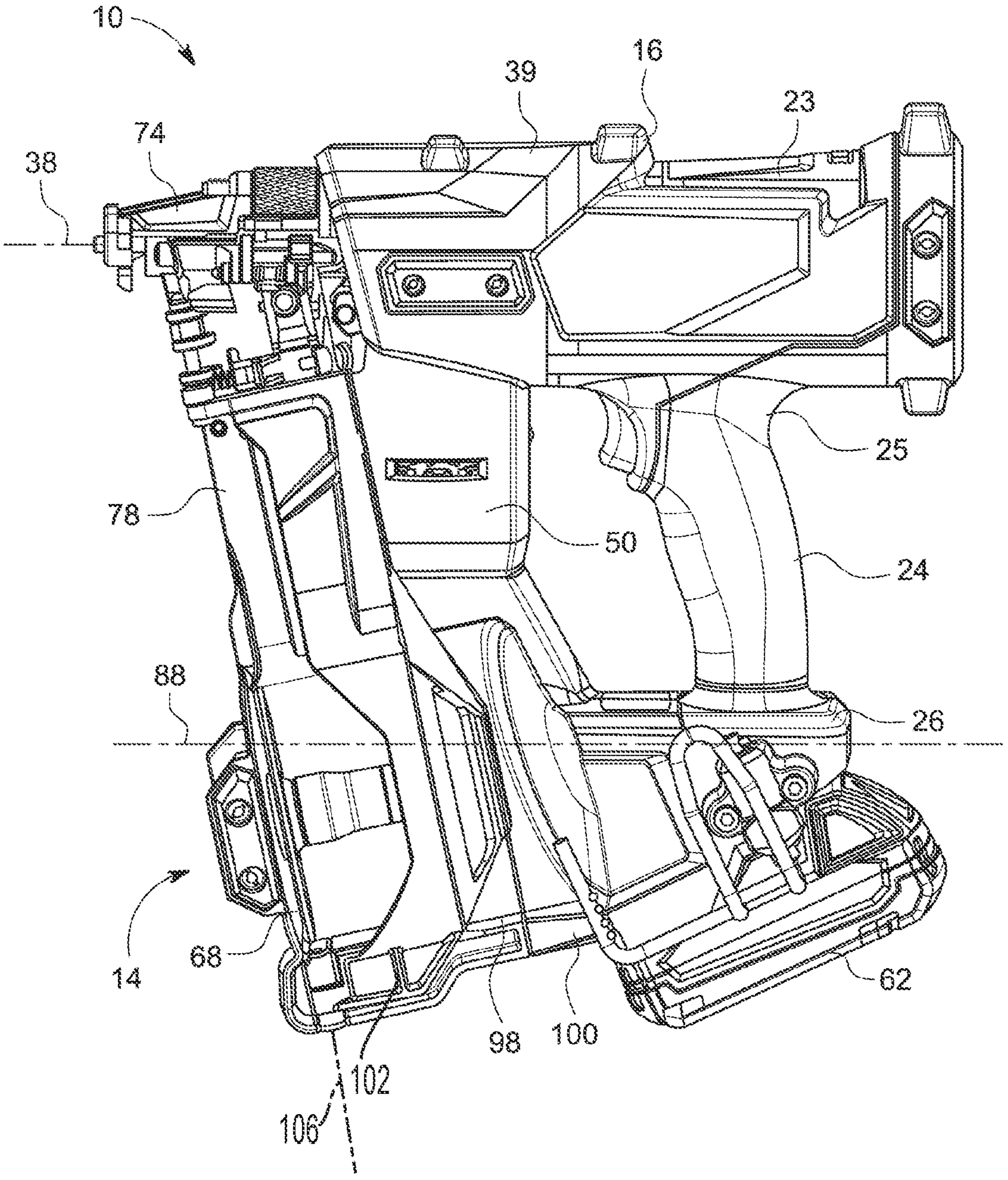
FIG. 1 is a side view of a powered fastener driver in accordance with an embodiment of the invention.
Figure 2:
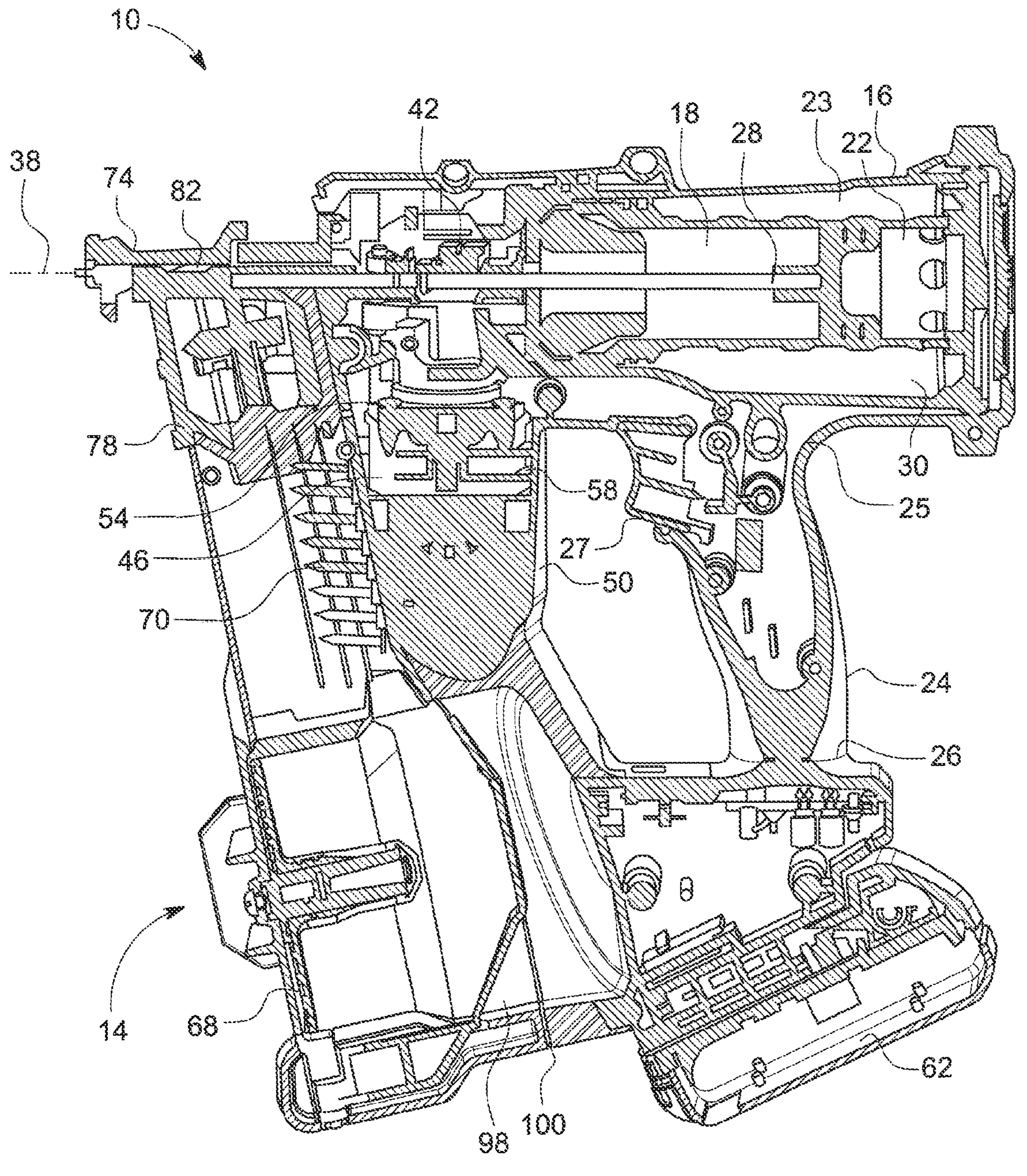
FIG. 2 is a cross-sectional view of the powered fastener driver of FIG. 1.

With reference to FIGS. 1 and 2, a gas spring-powered fastener driver 10 is operable to drive fasteners (e.g., nails) held within a canister magazine 14 into a workpiece. The fastener driver 10 includes a housing 16, a driver cylinder 18 positioned within the housing 16, and a moveable piston 22 positioned within the cylinder 18. The housing 16 includes a head portion 23 and a handle portion 24 extending therefrom. The handle portion 24 includes a first end 25 coupled with the head portion 23 and an opposite, second end 26. A trigger 27 is disposed on the handle portion 24 for activating the fastener driver 10 through actuation of the trigger 27. The driver cylinder 18 is positioned within the head portion 23 of the housing 16. The fastener driver 10 further includes a driver blade 28 that is attached to the piston 22 and moveable therewith. The fastener driver 10 does not require an external source of air pressure, but rather includes a storage chamber cylinder 30 of pressurized gas in fluid communication with the cylinder 18. In the illustrated embodiment, the cylinder 18 and moveable piston 22 are positioned within the storage chamber cylinder 30.

Figure 5:
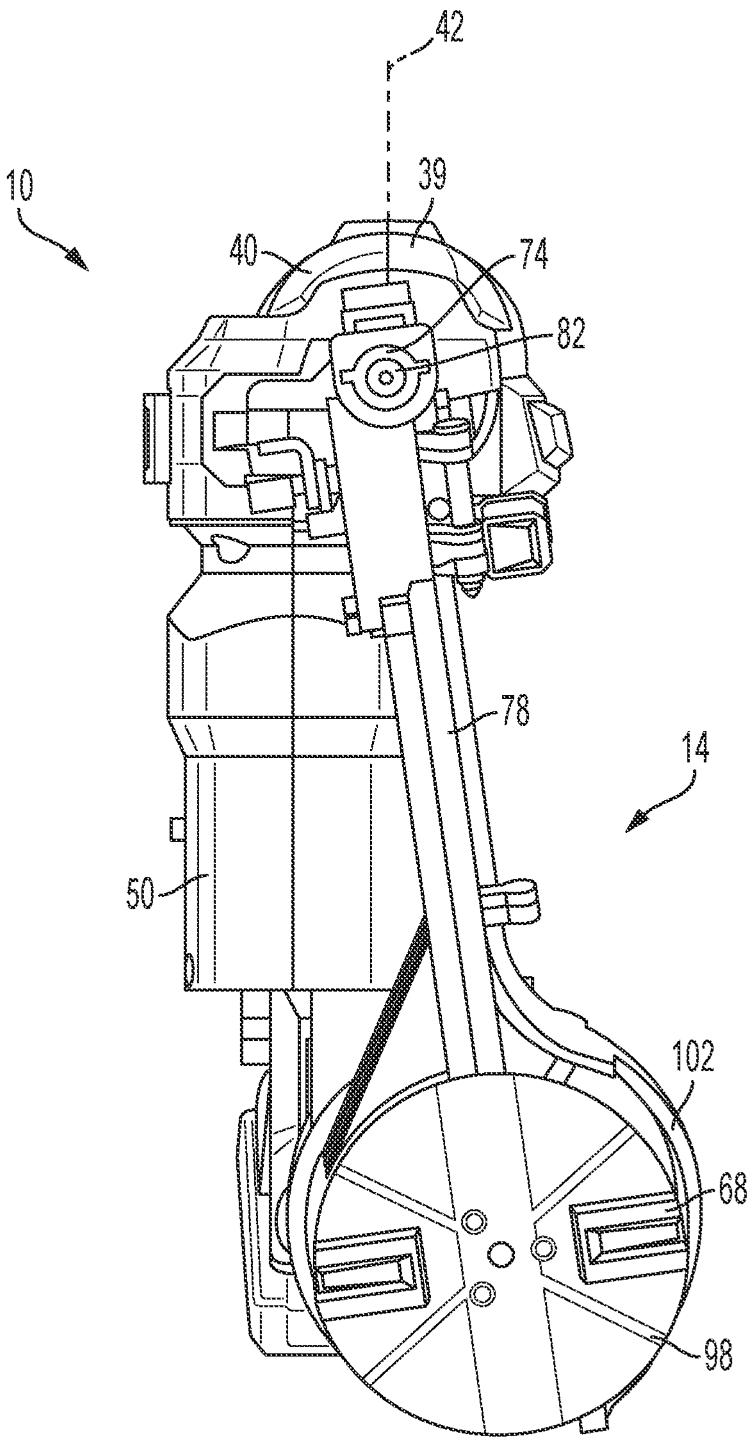
FIG. 5 is a front view of the powered fastener driver of FIG. 4.

With reference to FIG. 2, the cylinder 18 and the driver blade 28 define a driving axis 38, and during a driving cycle the driver blade 28 and piston 22 are moveable between a top dead center ("TDC") position and a bottom dead center ("BDC") or "driven" position. The housing includes first and second clamshell portions 39, 40 mated along a plane 42 in which the driving axis 38 is contained or is parallel thereto (as shown in FIG. 5). The fastener driver 10 further includes a lifting mechanism 42 (FIG. 2), which is powered by a motor 46, and which is operable to move the driver blade 28 from the BDC position toward the TDC position. The motor 46 is positioned in line with the lifting mechanism 42 in a drive unit housing portion 50 of the housing 16. A transmission 54 is positioned between the motor 46 and the lifting mechanism 42 in the drive unit housing portion 50 of the housing 16. The motor 46 and the transmission 54 together form a drive unit 58 for moving the driver blade 28 along the driving axis 38 from the BDC position toward the TDC position. The fastener driver 10 also includes a battery pack 62 coupled to the second end 26 of the handle portion 24 that supplies electrical current to the motor 46 in response to actuation of the trigger 27, which in turn rotates the lifting mechanism 42.

In operation, after a fastener is driven into a workpiece, the lifting mechanism 42 drives the piston 22 and the driver blade 28 toward the TDC position along the driving axis 38 with continued activation of the motor 46. As the piston 22 and the driver blade 28 are driven toward the TDC position, the gas above the piston 22 and the gas within the storage chamber cylinder 30 is compressed. Just prior to reaching the TDC position, the motor 46 is deactivated, stopping the piston 22 and the driver blade 28 in a "ready" position where the piston 22 and the driver blade 28 are held until initiation of the next fastener driving operation, which is commenced by user activation of the trigger 27. When the driver blade 28 is released by the lifting mechanism 42, the compressed gas above the piston 22 and within the storage chamber cylinder 30 drives the piston 22 and the driver blade 28 to the BDC position along the driving axis 38, thereby driving a fastener into a workpiece. The illustrated fastener driver 10 therefore operates on a gas spring principle utilizing the lifting mechanism 42 and the piston 22 to compress the gas within the cylinder 18 and the storage chamber cylinder 30 in preparation for a fastener driving cycle.

The magazine 14 includes a canister portion 68 in which collated fasteners 70 are arranged in a coil. The magazine 14 also includes a straight or linear portion 78 that is coupled to a nosepiece 74 of the fastener driver 10. The fasteners 70 are sequentially transferred from the canister portion 68, through the linear portion 78, and into a driver channel 82 within the nosepiece 74 by a pusher mechanism 86 (shown in FIG. 1). After a forwardmost fastener 70 is inserted into the driver channel 82, the driver blade 28 is movable within the driver channel 82 to discharge the fastener 70 from the driver channel 82 and into a workpiece.

With reference to FIG. 1, an imaginary plane 88 bisects both the canister portion 68 of the magazine 14 and the second end 26 of the handle portion 24 of the housing 16. The imaginary plane 88 is parallel with the driving axis 38.

Figure 4:
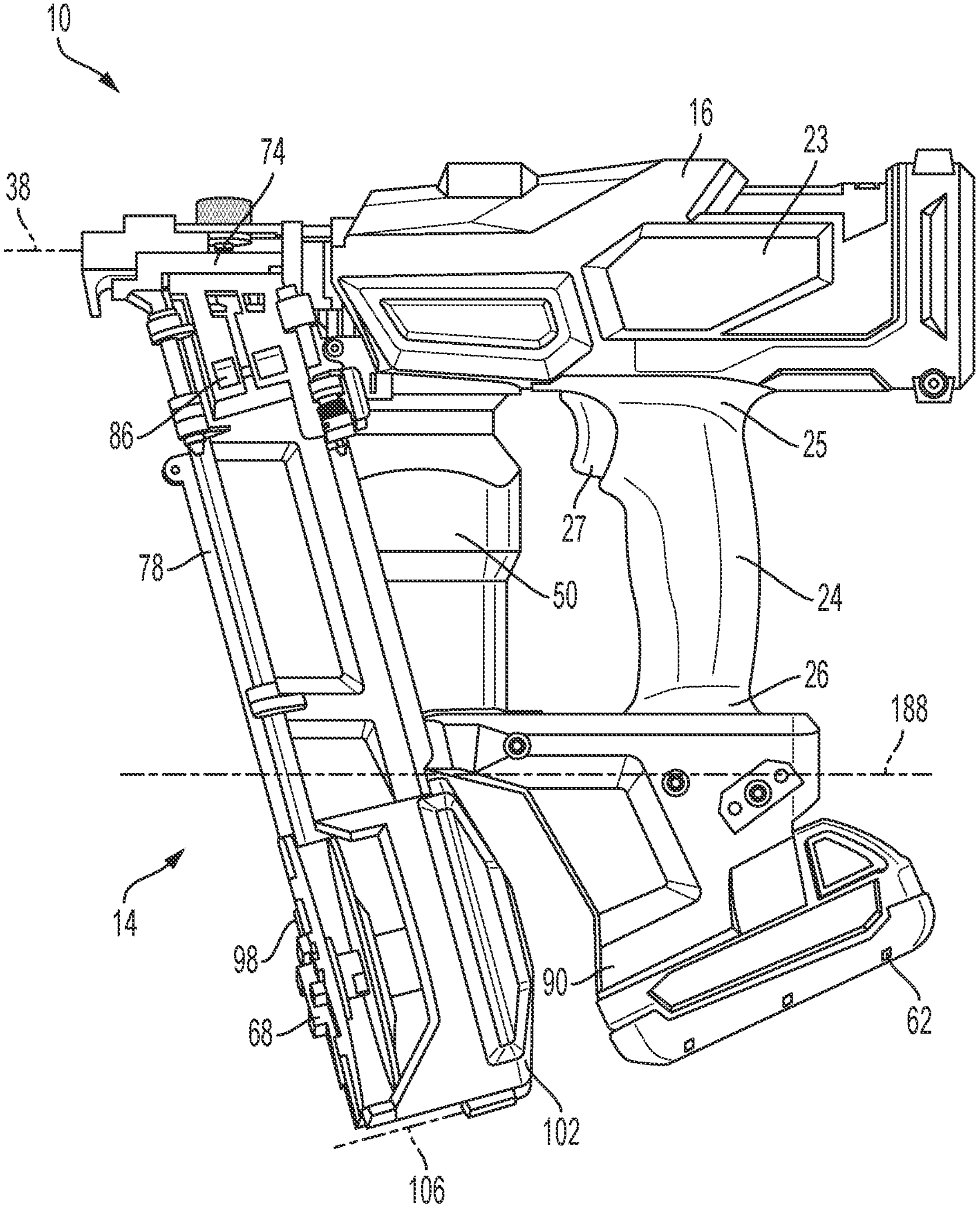
FIG. 4 is a side view of a powered fastener driver in accordance with another embodiment of the invention.

In other embodiments, the canister portion 68 is positioned on an opposite side of an imaginary plane 188 as the second end 26 of the handle portion 24, as shown in FIG. 4. The imaginary plane 188 is positioned between the magazine 14 and the second end 26 of the handle portion 24 and is parallel with the driving axis 38.

Figure 6:
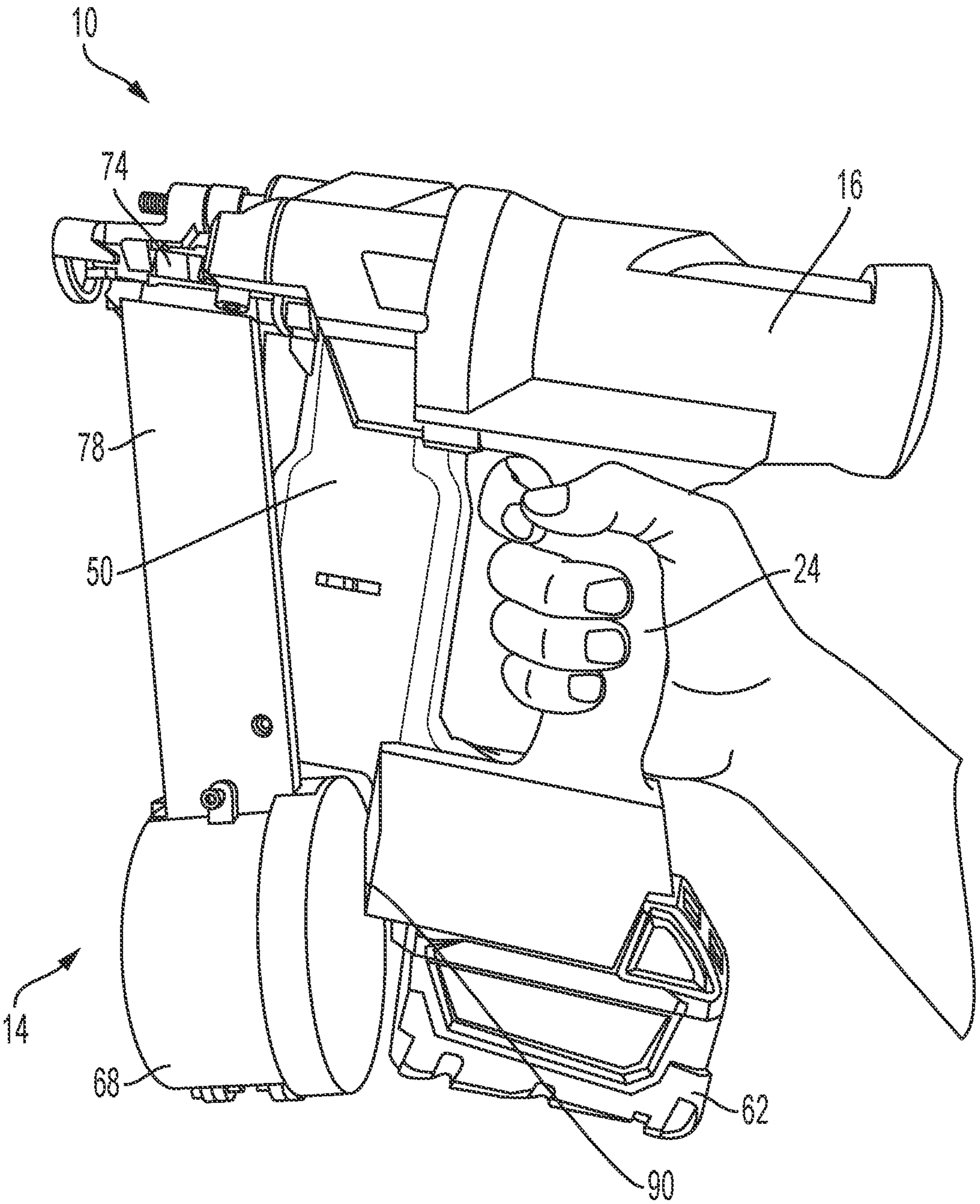
FIG. 6 is a side perspective view of the powered fastener driver of FIG. 4 with a magazine in a closed position.
Figure 7:
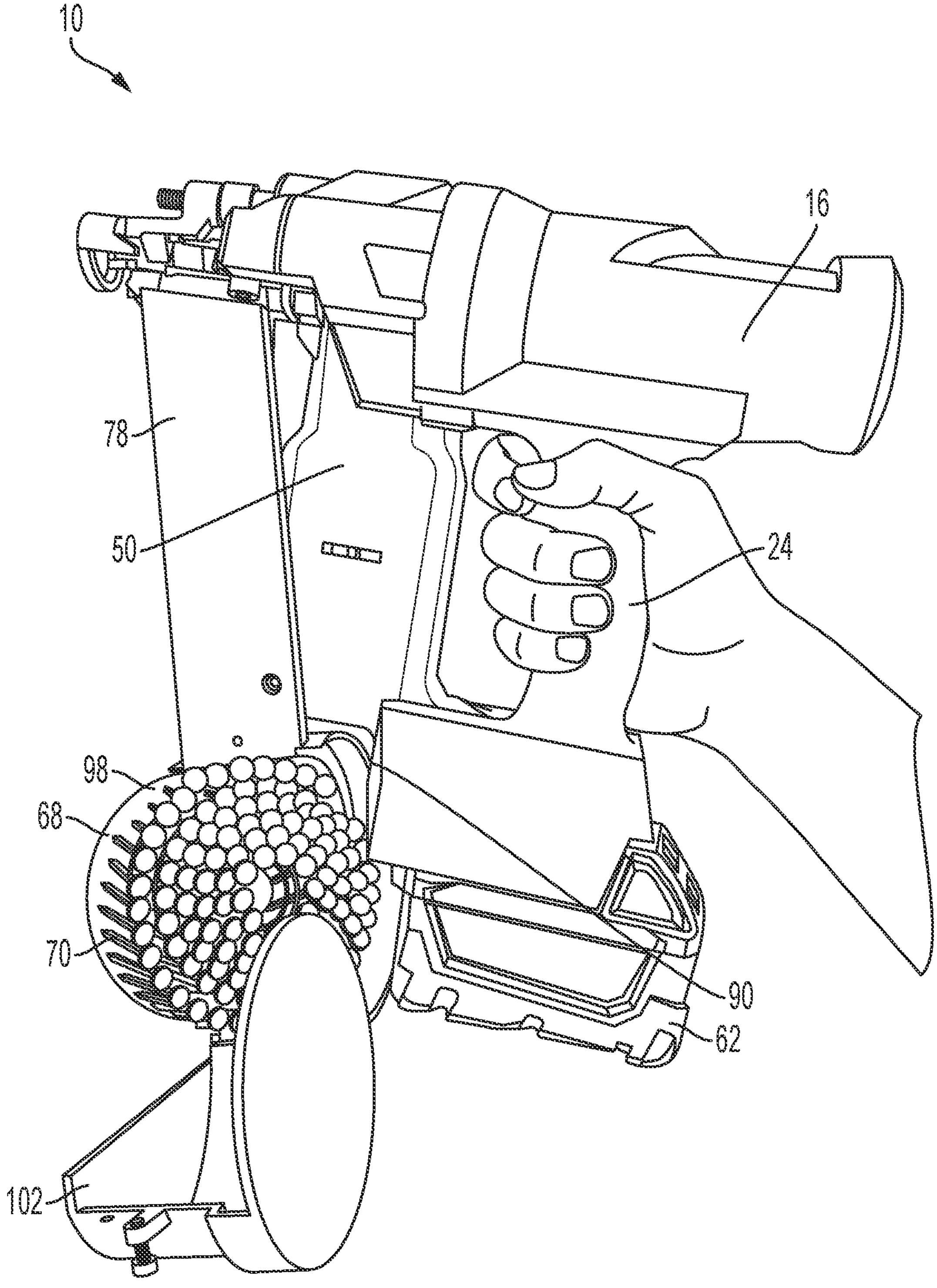
FIG. 7 is a side perspective view of the powered fastener driver of FIG. 6 with the magazine in an open position.

With reference to FIGS. 1 and 4, the magazine 14 includes a base 98 and an attached cover 102. The base 98 is sized to receive the coiled fasteners 70 and, in some embodiments, is integrally formed as a single piece with the first clamshell portion 39 of the housing 16. In addition to the base 98 defining part of the canister portion 68 of the magazine 14, the base 98 also defines part of the linear portion 78 of the magazine 14. In other words, the first clamshell portion 39 of the housing 16 defines parts of the handle portion 24, the drive unit housing portion 50, and the base 98, and is formed from one continuous piece of material. In other embodiments, the base 98 of the magazine 14 is formed separately from the housing 16 and is attached to the nosepiece 74 by fasteners 70, as shown in FIGS. 6 and 7.

In the embodiment shown in FIG. 1, the housing 16 is integrally formed with the base 98 along a mold seam 100 disposed behind the motor 46 and below the battery pack 62 (shown in FIG. 3). More specifically, the mold seam 100 is disposed along a length of the drive unit portion 50 of the housing 16, between the handle portion 24 of the housing 16 and the canister portion 68 of the magazine 14. The first clamshell portion 39 and the base 98 are co-molded along the mold seam 100 such that the drive unit housing portion 50, the handle portion 24, and the base 98 are defined by the first clamshell portion 39. In other embodiments, the first clamshell portion 39 and the base 98 may be formed together through injection molding, single molding, and the like. Co-molding is a process in which two materials are molded into a singular material. Specifically, when a second material is at or near its melting point, the second material fills voids formed in a previously molded first material. After the second material fills the voids in the first material, the first and second materials are cooled. Once cooled, the second material cannot be removed from the first material.

Figure 3:
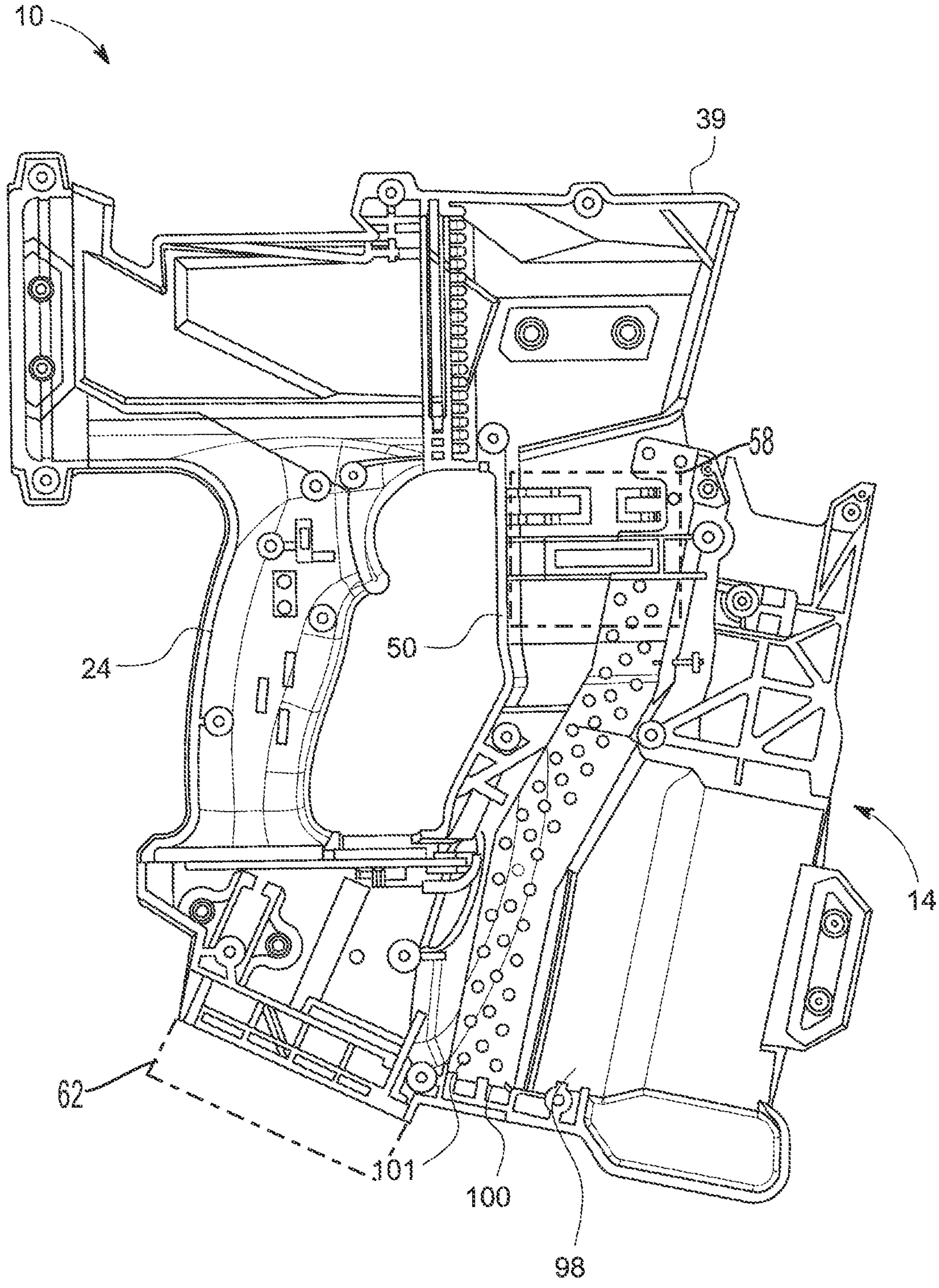
FIG. 3 is a side view of the powered fastener driver of FIG. 1 with parts removed.

With reference to FIG. 3, the base 98 is composed of a first material and the first clamshell portion 39 is composed of a second material. The base 98 and the first clamshell portion 39 are co-molded along the mold seam 100. During molding, the first material is first molded, with a plurality of voids 101 being formed along the seam 100. The second material is then heated and molded. During this time, the second material fills the voids 101 formed in the first material along the seam 100. The second material is then cooled. The voids 101 bind the second material to the first material such that the first and second materials do not separate after cooling. The seam 100 is therefore composed of the first material and the second material. In some embodiments, the first material is molded in a first color and the second material is molded in a second color, the first color being different than the second color. In other embodiments, the first and second colors may be the same. Having the base 98 be a different color than the first clamshell portion 39 allows the base 98 to be differentiated from the remainder of the fastener driver 10.

As shown in FIG. 4, in other embodiments, the housing 16 includes a recess 90 positioned behind the motor 46 and below the battery pack 62 such that the canister portion is at least partially disposed within the recess 90. The recess 90 is sized to nest the canister portion 68 therein. When nested in the recess 90, the canister portion 68 is positioned behind the motor 46 and below the battery pack 62. Therefore, the canister portion 68 is cantilevered from a rear end of the linear portion 78 of the magazine 14. By locating the canister portion 68 of the magazine 14 in this manner, the weight of the coiled fasteners 70 is shifted further rearward, such that a center of mass of the fastener driver 10 with a fully loaded magazine 14 is near the handle portion 24. Having the center of mass near the handle portion 24 makes the fastener driver 10 easier for the user to hold and maneuver.

With reference to FIG. 1, the cover 102 is pivotable relative to the base 98 to provide access to an interior of the magazine 14, and therefore, the fasteners 70. In the illustrated embodiment, the cover 102 pivots relative to the base 98 about an axis 106 that is parallel to the linear portion 78 of the magazine between a closed position (shown in FIG. 1) and an open position. In other embodiments, as shown in FIGS. 4, 6, and 7, the axis 106 may be perpendicular to the linear portion 78. In the closed position, the cover 102 is latched to the base 98 such that the fasteners 70 are secured within the magazine 14. In the open position, the cover 102 is pivoted away from the base 98 such that the user may remove the fasteners 70 from the magazine 14 or reload fasteners 70 into the magazine 14, as shown in FIG. 7.

With reference to FIGS. 1 and 5, the linear portion 78 of the magazine 14 is positioned adjacent (i.e., side by side with) the drive unit housing portion 50 of the housing 16. The linear portion 78 is also oriented at an oblique angle relative to the driving axis 38.

Figure 8:
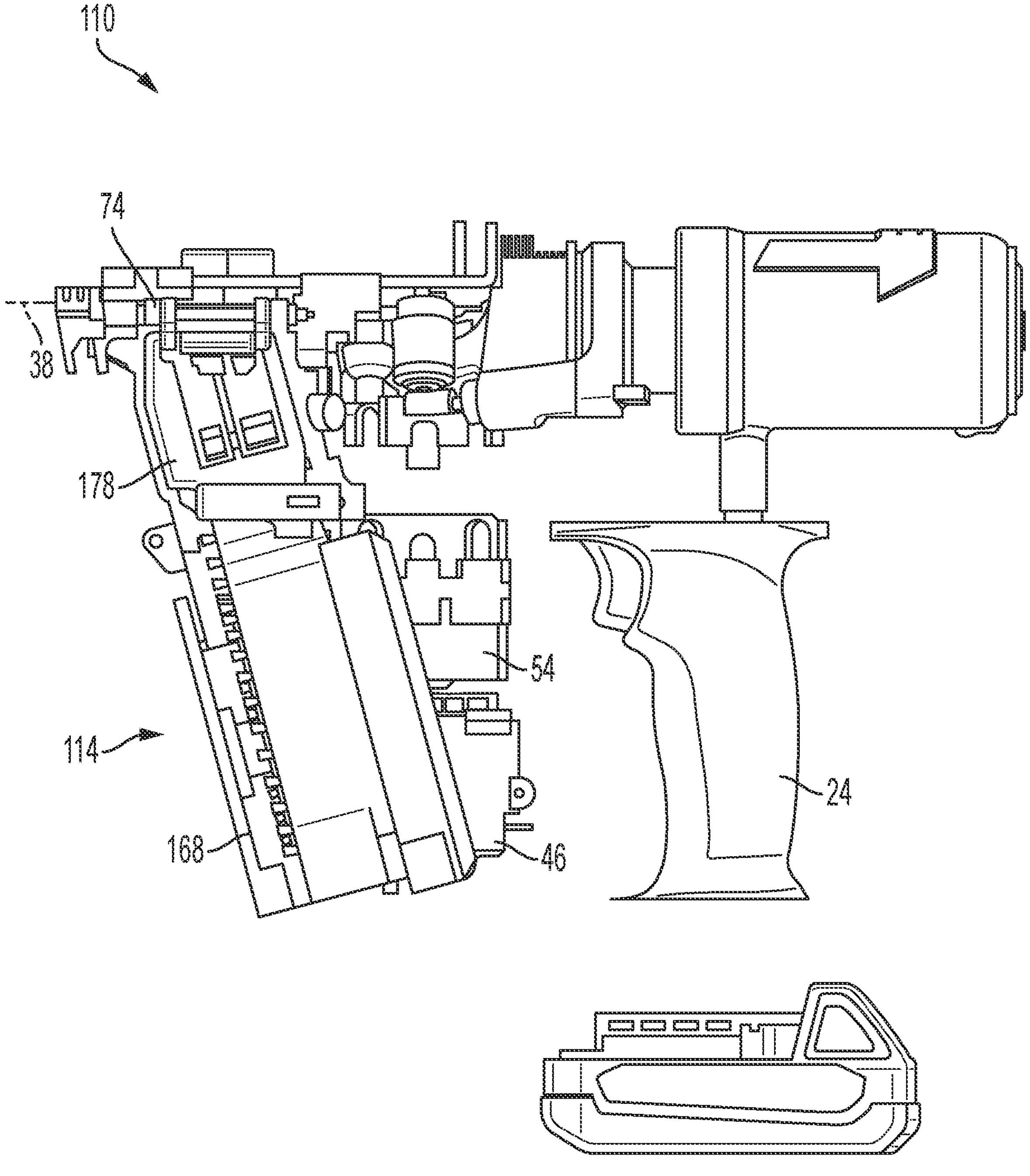
FIG. 8 is a side view of a powered fastener driver in accordance with yet another embodiment of the invention.
Figure 9:
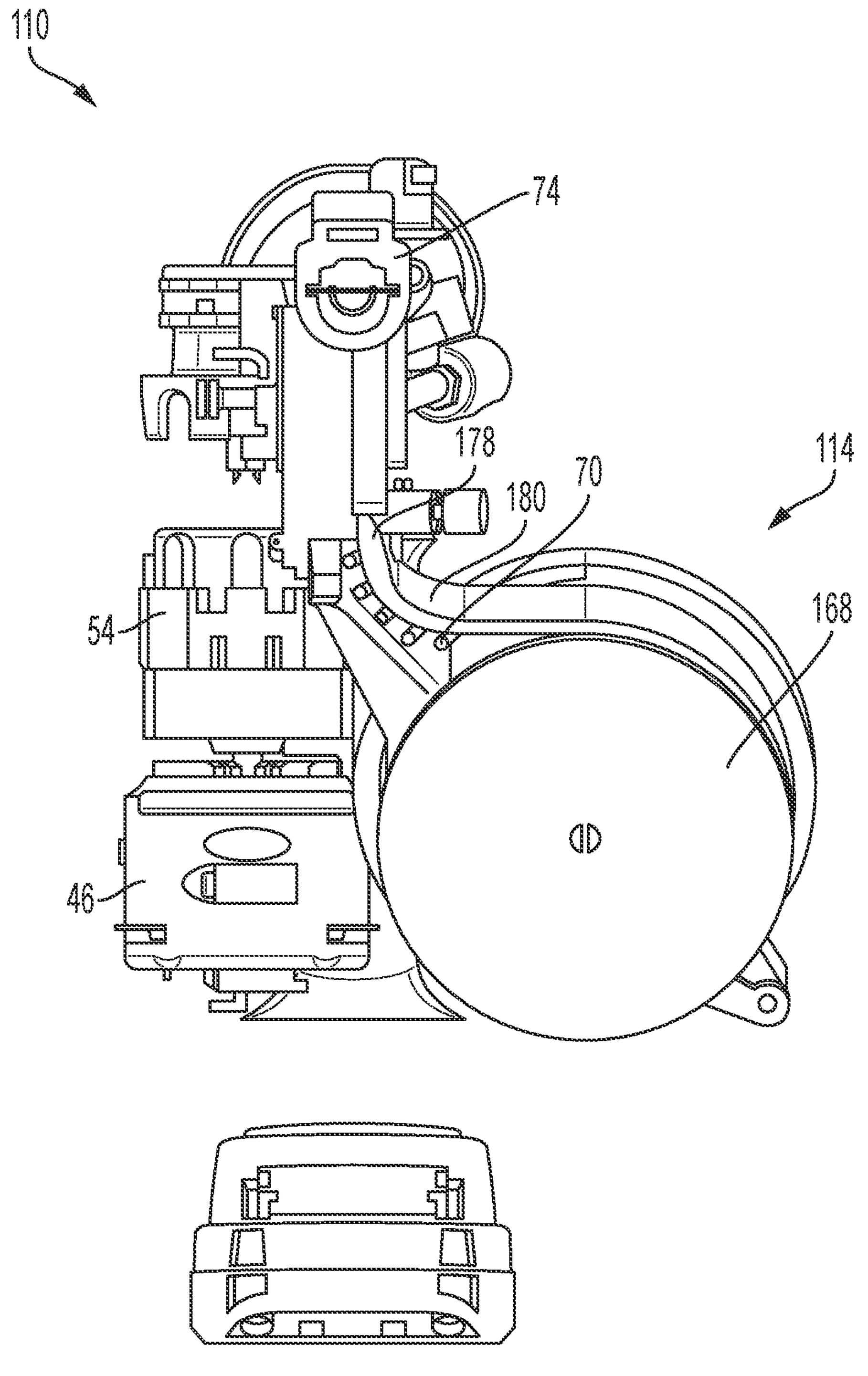
FIG. 9 is a front view of the powered fastener driver of FIG. 8.
Figure 10:
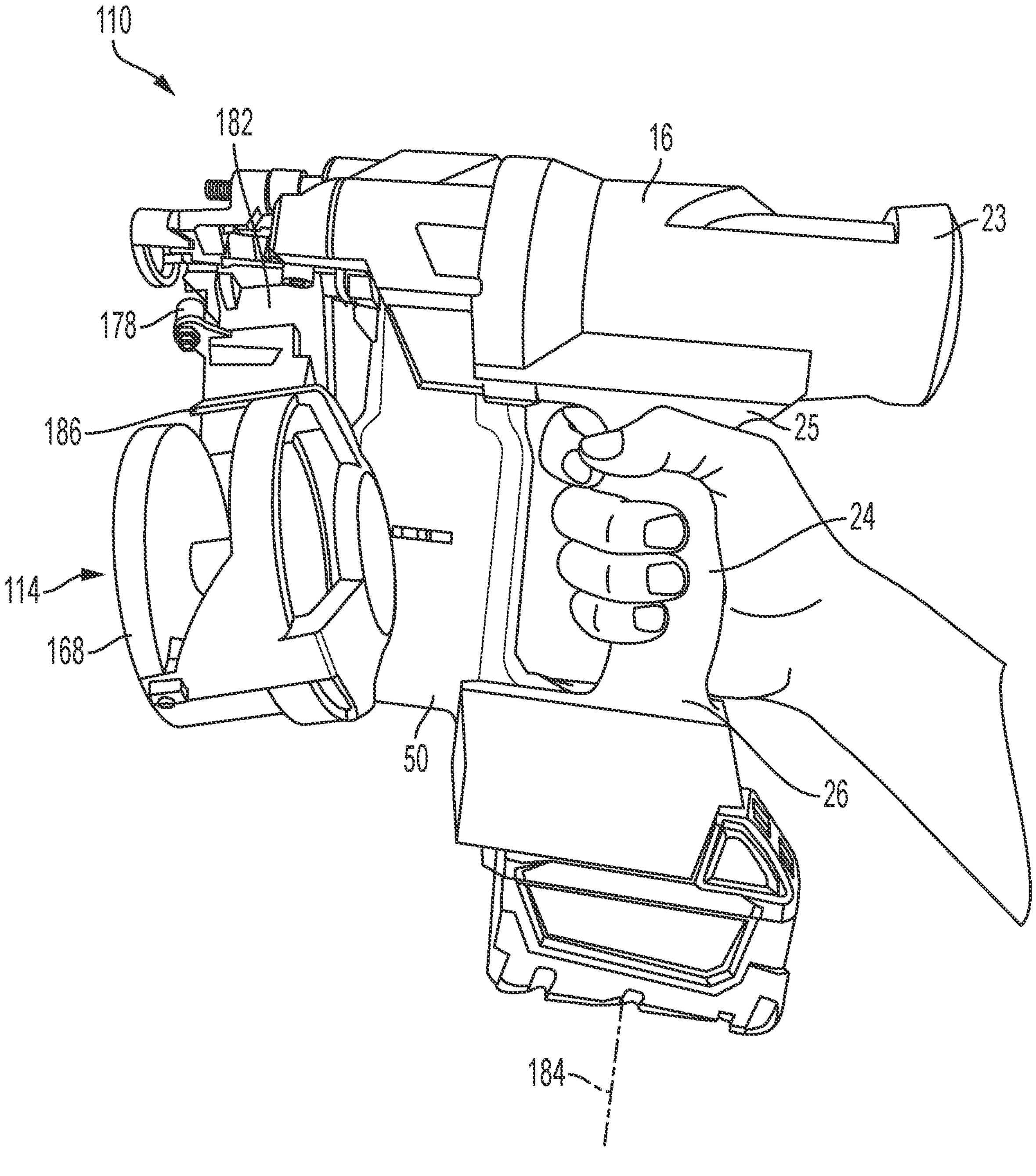
FIG. 10 is a side perspective view of the powered fastener driver of FIG. 8.
Figure 11:
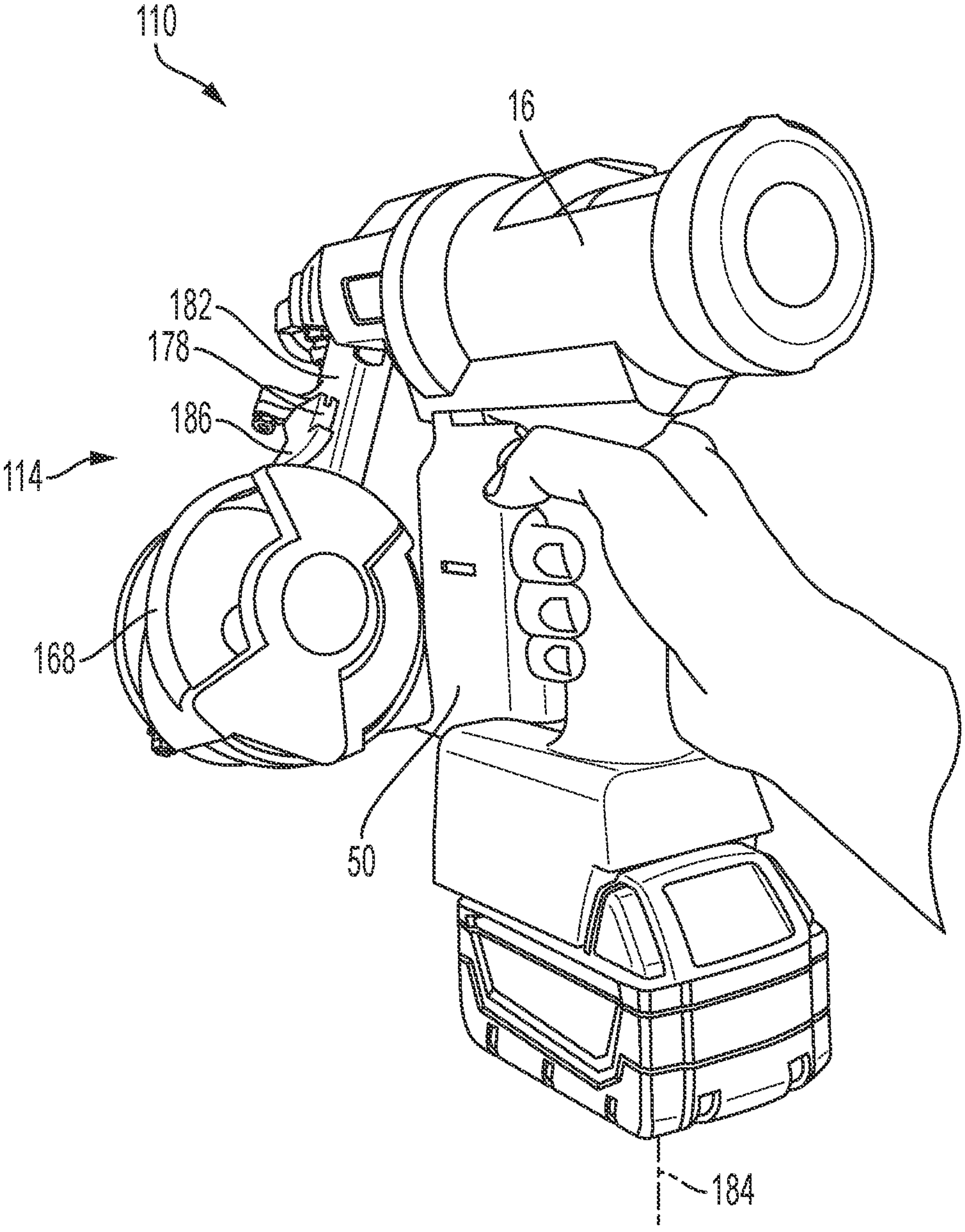
FIG. 11 is a rear perspective view of the powered fastener driver of FIG. 8.

FIGS. 8 and 9 illustrate a fastener driver 110 according to another embodiment of the invention. The fastener driver 110 is like the fastener driver 10 discussed above with like features being represented with like reference numbers. The fastener driver 110 includes a magazine 114 having a canister portion 168 that is coupled to the nosepiece 74 via a connector portion 178. The canister portion 168 is disposed on the drive unit housing portion 50 of the housing 16 such that the canister portion 168 is positioned beside the motor 46 and the transmission 54. A side of the canister portion 168 contacts a surface of the drive unit housing portion 50 of the housing 16. As shown in FIG. 9, when looking at a front of the fastener driver 110, a center of the canister portion 168 is positioned to the right of the driving axis 38. Due to the position of the canister portion 168, the connector portion 178 is curved. More specifically, the connector portion 178 has a curved portion 180 interconnected with the canister portion 168 of the magazine 114 and the nosepiece 74, with the curved portion 180 being merged with a rear sidewall of the nosepiece 74. In other embodiments, the connector portion 178 may include a straight portion 182 that extends from the nosepiece 74 at an oblique angle relative to a handle axis 184 and a curved portion 186 that couples the straight portion 182 with the canister portion 168 of the magazine 114 (shown in FIGS. 10 and 11). The curved connector portion 178 moves the fastener 70 to the right of the driving axis 38, to a position in which a center axis of the fastener 70 is colinear with the driving axis 38 when the fastener 70 enters the nosepiece 74.

Figure 12:
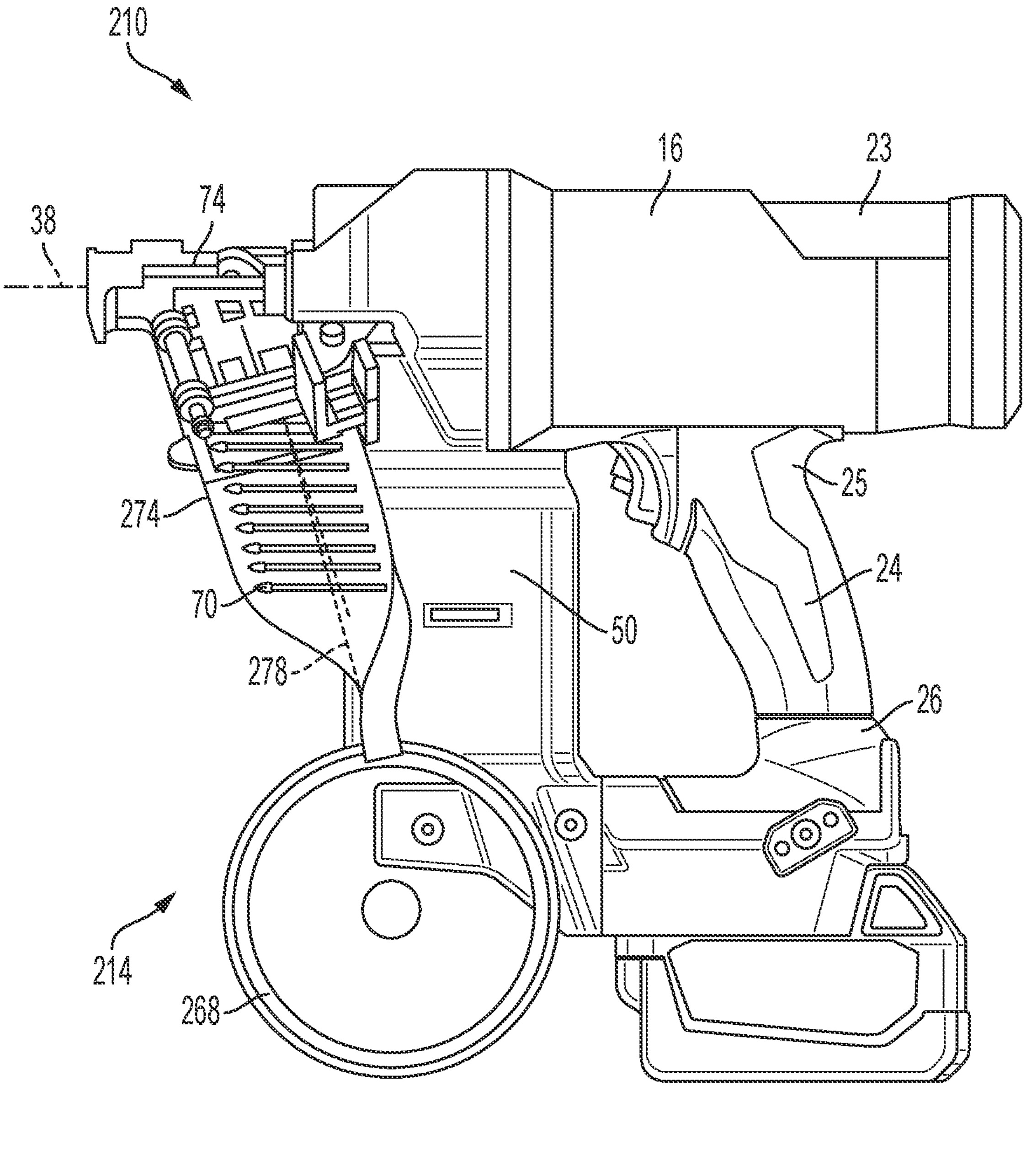
FIG. 12 is a side view of a powered fastener driver in accordance with a further embodiment of the invention.
Figure 13:
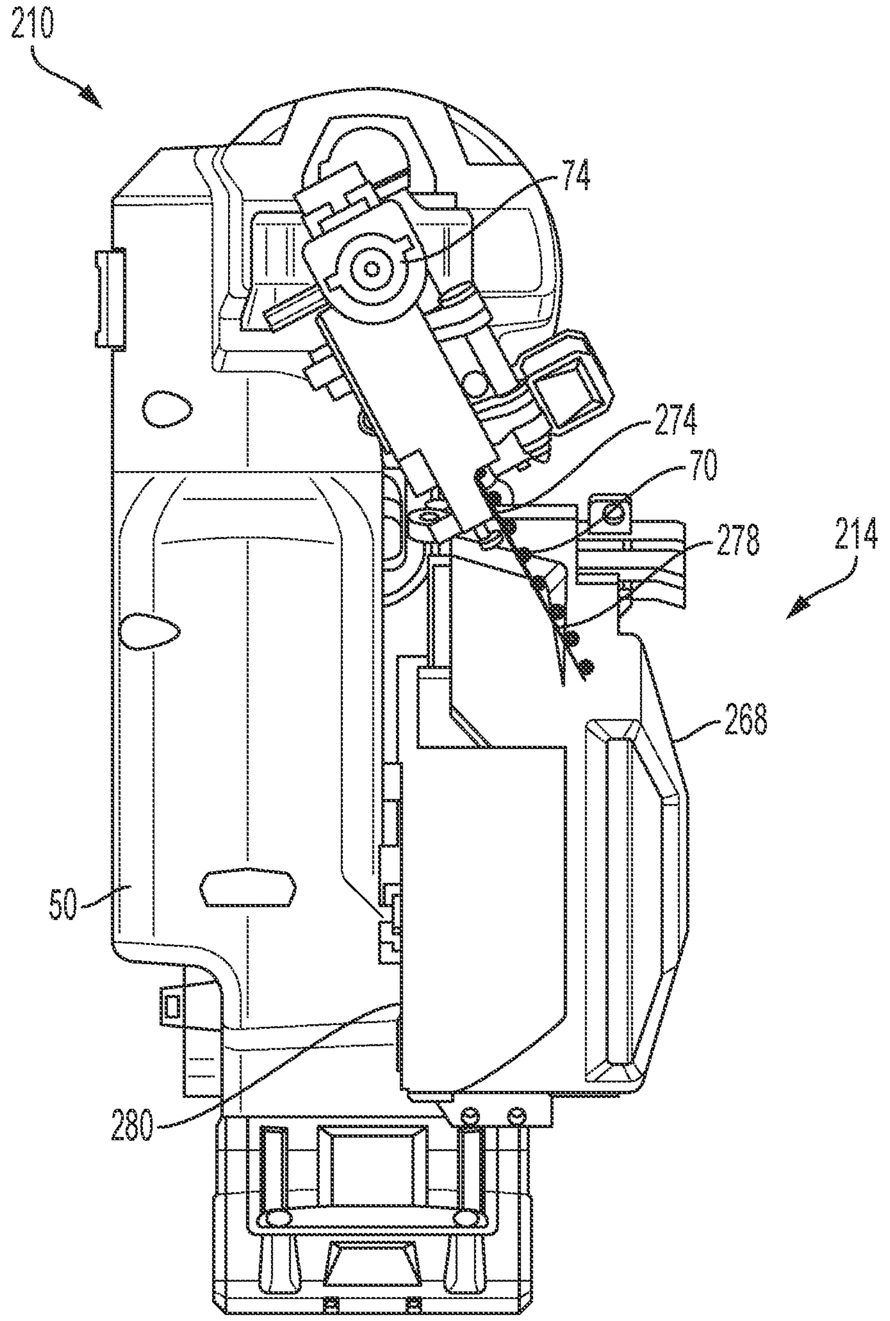
FIG. 13 is a front view of the powered fastener driver of FIG. 12.

FIGS. 12 and 13 illustrate a fastener driver 210 according to another embodiment of the invention. The fastener driver 210 is like the fastener driver 10 discussed above with like features being represented with like reference numbers. The fastener driver 210 includes a magazine 214 having a canister portion 268 in which collated fasteners 70 are arranged in a coil. The canister portion 268 is coupled to the nosepiece 74 via a linear portion 274 and a transition portion 278. The linear portion 274 is positioned adjacent the nosepiece 74. The transition portion 278 interconnects the canister portion 268 and the linear portion 274. The canister portion 268 is disposed adjacent the drive unit housing portion 50 of the housing 16. The canister portion 268 is rotated 90 degrees relative to the magazine 14 of the fastener driver 10 such that a bottom face 280 of the canister portion 268, against which the tips of the respective fasteners 70 are slidable, is facing the drive unit housing portion 50 of the housing 16. Due to the canister portion 268 being rotated, the transition portion 278 is also rotated or twisted along its length. The transition portion 278 rotates the fastener 70 90-degrees as the fasteners 70 travel through the transition portion 278. Rotating the fasteners 70 in the transition portion 278 reorients the central axes of the fasteners 70 to be colinear with the driving axis 38 when the fasteners 70, one after another, are transferred to the linear portion 274. The linear portion 274 feeds the fasteners 70 into the nosepiece 74 in the manner described above.

Figure 14:
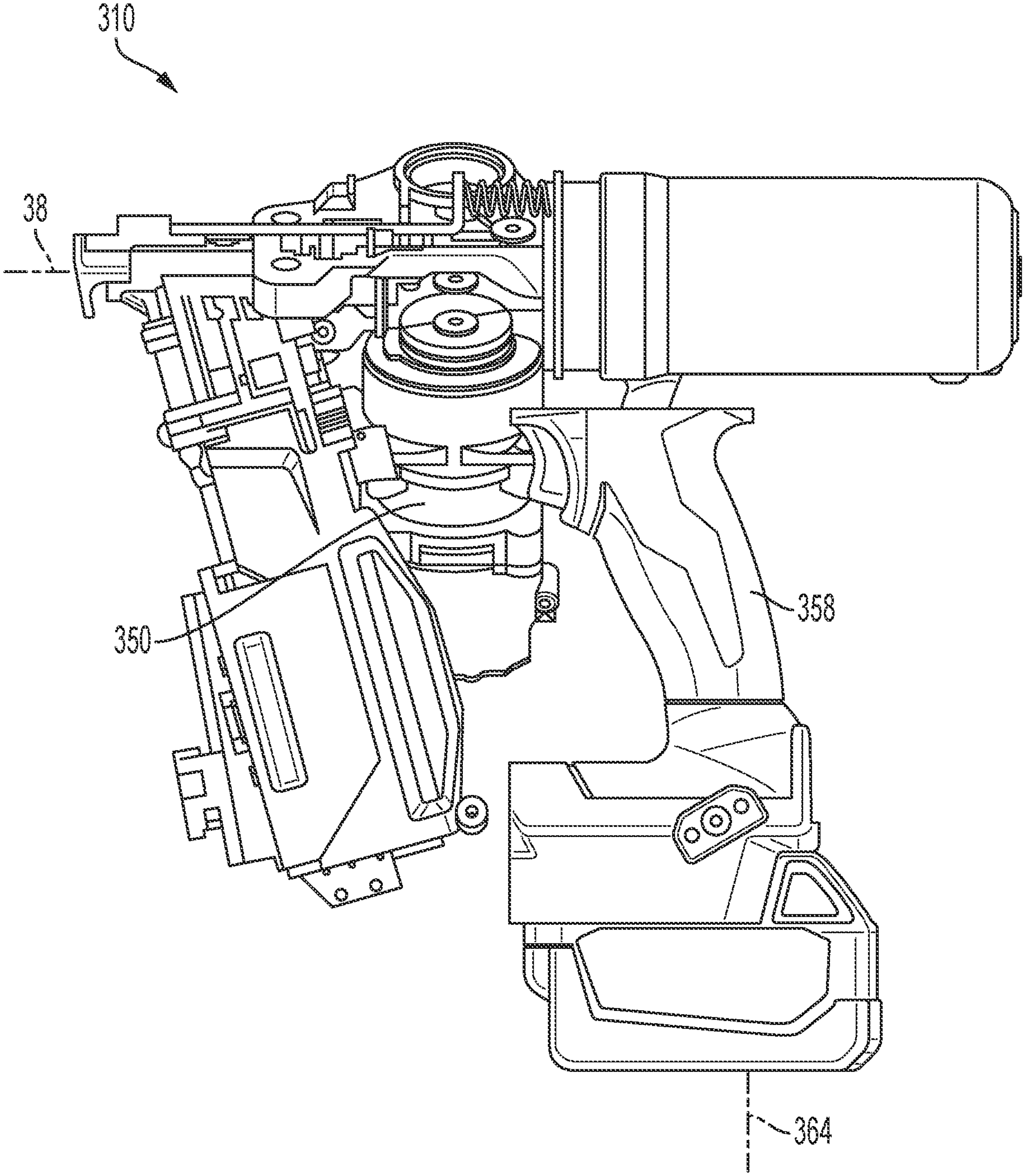
FIG. 14 is a side view of a powered fastener driver in accordance with another embodiment of the invention.
Figure 15:
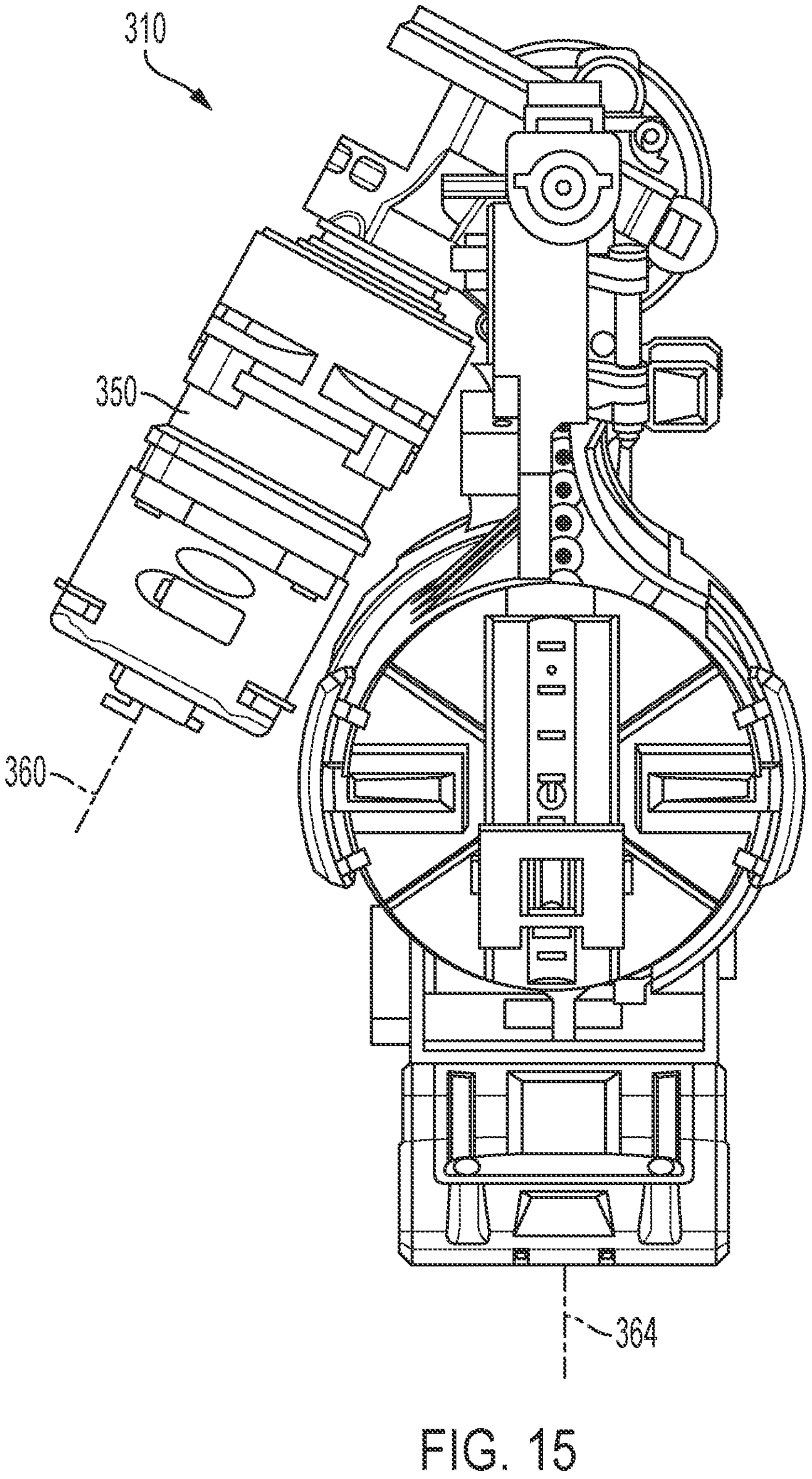
FIG. 15 is a front view of the powered fastener driver of FIG. 14.

FIGS. 14 and 15 illustrate a fastener driver 310 according to another embodiment of the invention. The fastener driver 310 is like the fastener driver 10 discussed above with like features being represented with like reference numbers. The fastener driver 310 includes a drive unit housing portion 350 that is similar to the drive unit housing portion 50, however, the drive unit housing portion 350 is angularly offset from the handle portion 358 of the housing 16 in an end view of the fastener driver 310 along the driving axis 38 (shown in FIG. 15). The drive unit housing portion 350 defines a drive unit axis 360 and the handle portion 358 defines a handle axis 364. The handle axis 364 is in an imaginary plane oriented perpendicular to the driving axis 38. As shown in FIG. 15, from a frame of reference that is perpendicular to the driving axis 38, the drive unit axis 360 is oriented at an oblique angle relative to the handle axis 364. The offset drive unit housing portion 350 allows the handle portion 358 to be disposed closer to the magazine 14 than the handle portion 24 of the fastener driver 10, locating the overall center of mass of the driver 310 closer to the handle portion 358 and thus the user's hand.

Figure 16:
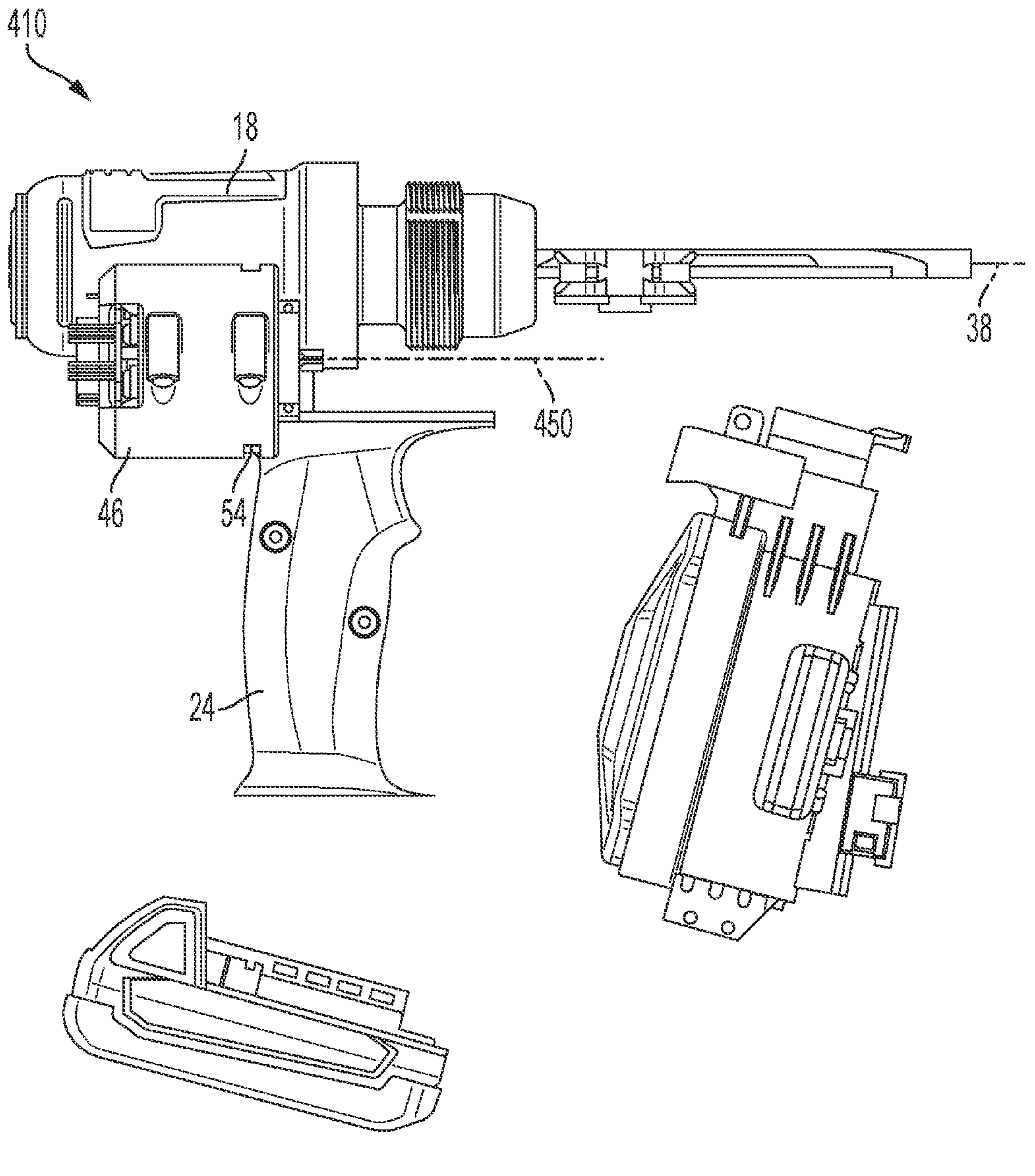
FIG. 16 is a side view of a powered fastener driver in accordance with yet another embodiment of the invention.
Figure 17:
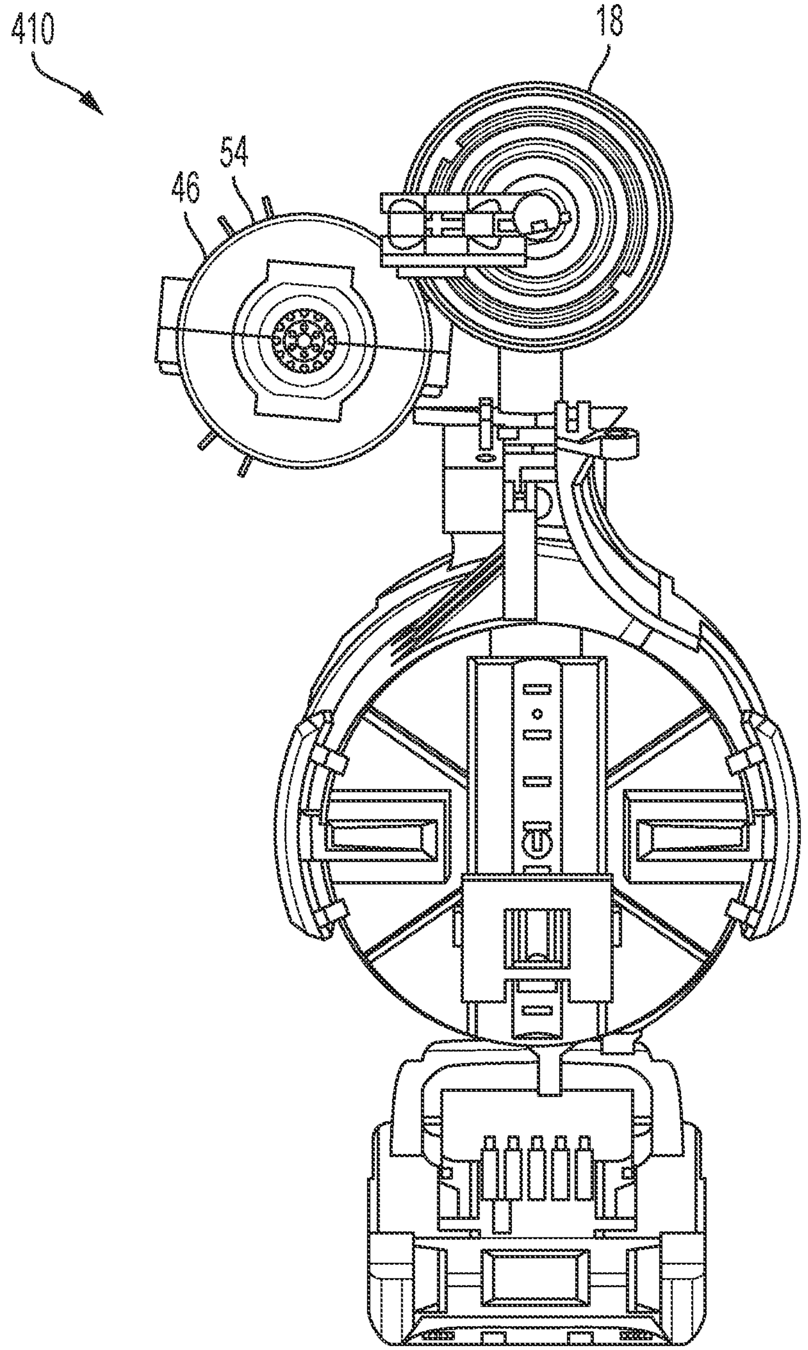
FIG. 17 is a front view of the powered fastener driver of FIG. 16.

FIGS. 16 and 17 illustrates a fastener driver 410 according to another embodiment of the invention. The fastener driver 410 is like the fastener driver 10 discussed above with like features being represented with like reference numbers. The fastener driver 410 includes a drive unit, including a motor 46 and a transmission 54, that is positioned parallel to the driving axis 38 and adjacent the cylinder 18. As shown in FIG. 16, the drive unit 58 defines a drive unit axis 450 that is parallel to the driving axis 38.

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered fastener driver comprising:
- a housing including a head portion, a handle portion extending therefrom, the handle portion including a first end coupled with the head portion and an opposite, second end, and a drive unit portion;
- a nosepiece extending from the housing;
- a driver blade movable within the nosepiece along a driving axis between a top-dead-center (TDC) position and a driven or bottom-dead-center (BDC) position;
- a drive unit for moving the driver blade along the driving axis from the BDC position toward the TDC position, the drive unit positioned within the drive unit portion of the housing;

- a piston coupled to the driver blade for movement therewith;
- a driver cylinder within which the piston is movable, the driver cylinder being located within the head portion of the housing; and
- a canister magazine configured to receive coiled fasteners, wherein at least a portion of the canister magazine is integrally formed as a single piece with at least a portion of the drive unit portion of the housing;
- wherein the housing includes first and second clamshell portions mated along a plane in which the driving axis is contained or is parallel thereto, and wherein at least a portion of the canister magazine and at least a portion of the drive unit portion are defined by the first clamshell portion of the housing.

2. The powered fastener driver of claim 1, wherein the canister magazine includes a base and a cover, and wherein the base is co-molded to the first clamshell portion.

3. The powered fastener driver of claim 2, wherein the base is molded in a first color and the first clamshell portion is molded in a second color, and wherein the first color is different than the second color.

4. The powered fastener driver of claim 1, further comprising a battery pack coupled to the handle portion, wherein the housing is integrally formed with the canister magazine along a mold seam disposed along a length of the drive unit portion of the housing, between the handle portion of the housing and the canister magazine.

5. The powered fastener driver of claim 4, wherein the canister magazine is located behind the drive unit and below the battery pack.

6. The powered fastener driver of claim 1, wherein an imaginary plane bisects both the canister magazine and the second end of the handle portion, wherein the imaginary plane is parallel to the driving axis.

7. A powered fastener driver comprising:
- a housing including a head portion and a handle portion extending therefrom, the handle portion including a first end coupled with the head portion and an opposite, second end;
- a nosepiece extending from the housing;
- a driver blade movable within the nosepiece along a driving axis between a top-dead-center (TDC) position and a driven or bottom-dead-center (BDC) position;
- a drive unit for moving the driver blade along the driving axis from the BDC position toward the TDC position, the drive unit positioned within the drive unit portion of the housing;
- a piston coupled to the driver blade for movement therewith;
- a driver cylinder within which the piston is movable, the driver cylinder being located within the head portion of the housing;
- a battery pack coupled to the handle portion; and
- a canister magazine configured to receive coiled fasteners;
- wherein the housing includes a mold seam positioned behind the drive unit and below the battery pack, and wherein the housing is co-molded to the canister magazine along the mold seam.

8. The powered fastener driver of claim 7, wherein the housing includes first and second clamshell portions mated along a plane in which the driving axis is contained or is parallel thereto, and wherein at least a portion of the canister magazine and at least a portion of the drive unit portion are defined by the first clamshell portion of the housing.

9. The powered fastener driver of claim 8, wherein the canister magazine includes a base and a cover, and wherein the base is co-molded to the first clamshell portion.

10. The powered fastener driver of claim 9, wherein the first clamshell portion is composed of a first material and the base is composed of a second material, the first material being different than the second material.

11. The powered fastener driver of claim 10, wherein the mold seam is composed of both the first material and the second material.

12. The powered fastener driver of claim 11, wherein the second material fills voids in the first material along the mold seam.

13. The powered fastener driver of claim 10, wherein the first material is molded in a first color and the second material is molded in a second color, and wherein the first color is different than the second color.

14. A powered fastener driver comprising:

a housing including a head portion and a handle portion extending therefrom, the handle portion including a first end coupled with the head portion and an opposite, second end;

a nosepiece extending from the housing;

a driver blade movable within the nosepiece along a driving axis between a top-dead-center (TDC) position and a driven or bottom-dead-center (BDC) position;

a piston coupled to the driver blade for movement therewith;

a driver cylinder within which the piston is movable, the driver cylinder being located within the head portion of the housing; and a canister magazine configured to receive coiled fasteners, the canister magazine being positioned on an opposite side of an imaginary plane as the second end of the handle portion, wherein the imaginary plane is parallel to the driving axis;

wherein the housing includes first and second clamshell portions mated along a plane in which the driving axis is contained or is parallel thereto, and wherein at least a portion of the canister magazine is integrally formed as a single piece with the first clamshell portion of the housing.

15. The powered fastener driver of claim 14, wherein the canister magazine includes a base for receiving fasteners and a linear portion coupled to the base and the nosepiece, and wherein at least portions of the base and the linear portion are integrally formed as a single piece with the first clamshell portion of the housing.

16. The powered fastener driver of claim 14, further comprising a battery pack coupled to the handle portion and a drive unit for moving the driver blade along the driving axis from the BDC position toward the TDC position.

17. The powered fastener driver of claim 16, wherein the housing includes a recess positioned behind the drive unit and below the battery pack.

18. The powered fastener driver of claim 17, wherein the canister magazine is disposed in the recess.

19. A powered fastener driver comprising:

a housing including a head portion, a handle portion extending therefrom, the handle portion including a first end coupled with the head portion and an opposite, second end, and a drive unit portion;

a nosepiece extending from the housing;

a driver blade movable within the nosepiece along a driving axis between a top-dead-center (TDC) position and a driven or bottom-dead-center (BDC) position;

a drive unit for moving the driver blade along the driving axis from the BDC position toward the TDC position, the drive unit positioned within the drive unit portion of the housing;

a piston coupled to the driver blade for movement therewith;

a driver cylinder within which the piston is movable, the driver cylinder being located within the head portion of the housing;

a canister magazine configured to receive coiled fasteners, wherein at least a portion of the canister magazine is integrally formed as a single piece with at least a portion of the drive unit portion of the housing; and a battery pack coupled to the handle portion, wherein the housing is integrally formed with the canister magazine along a mold seam disposed along a length of the drive unit portion of the housing, between the handle portion of the housing and the canister magazine.

* * * * *